US012604084B2

(12) United States Patent
Kishino

(10) Patent No.: US 12,604,084 B2
(45) Date of Patent: Apr. 14, 2026

(54) IMAGE CAPTURING APPARATUS, CONTROL METHOD THEREFOR, STORAGE MEDIUM STORING CONTROL PROGRAM THEREFOR, AND IMAGE CAPTURING SYSTEM

(71) Applicant: CANON KABUSHIKI KAISHA, Tokyo (JP)

(72) Inventor: Hiroshi Kishino, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 185 days.

(21) Appl. No.: 18/502,756

(22) Filed: Nov. 6, 2023

(65) Prior Publication Data

US 2024/0171851 A1     May 23, 2024

(30) Foreign Application Priority Data

Nov. 22, 2022     (JP) ................................. 2022-186588
Jun. 5, 2023     (JP) ................................. 2023-092460

(51) Int. Cl.
*H04N 23/63*          (2023.01)
*H04N 23/62*          (2023.01)

(52) U.S. Cl.
CPC ........... *H04N 23/633* (2023.01); *H04N 23/62* (2023.01)

(58) Field of Classification Search
CPC .... H04N 23/62; H04N 23/631; H04N 23/632; H04N 23/633
See application file for complete search history.

(56) References Cited

U.S. PATENT DOCUMENTS

| | | | | |
|---|---|---|---|---|
| 2020/0007752 A1* | 1/2020 | Yoshida | ................ | G06F 3/0488 |
| 2020/0092494 A1* | 3/2020 | Ogawa | ................ | H04N 23/635 |
| 2022/0210320 A1* | 6/2022 | Osuka | ................ | H04N 23/633 |
| 2023/0412910 A1* | 12/2023 | Nishimoto | .............. | G06F 21/84 |
| 2024/0179395 A1* | 5/2024 | Seki | ..................... | H04N 23/631 |

FOREIGN PATENT DOCUMENTS

JP          2016-167723 A          9/2016

* cited by examiner

*Primary Examiner* — Kelly L Jerabek
(74) *Attorney, Agent, or Firm* — Cowan, Liebowitz & Latman, P.C.

(57)          ABSTRACT
An image capturing apparatus capable of improving, in live view display, operability of operation members to which related functions are registered. The image capturing apparatus includes an image capturing unit, a display device that displays a live view image obtained by the image capturing unit, operation members, a registration unit that respectively registers predetermined functions to at least two operation members among the operation members, and a control unit that displays an exterior guide of the image capturing apparatus showing an exterior surface of the image capturing apparatus on which the at least two operation members are arranged together with the live view image on the display device in a case where related functions are registered to the at least two operation members.

13 Claims, 15 Drawing Sheets

201 CPU

202 RAM

203 ROM

204 OPERATION UNIT

205 INPUT I/F

206 EXTERNAL I/F

Figure 4:
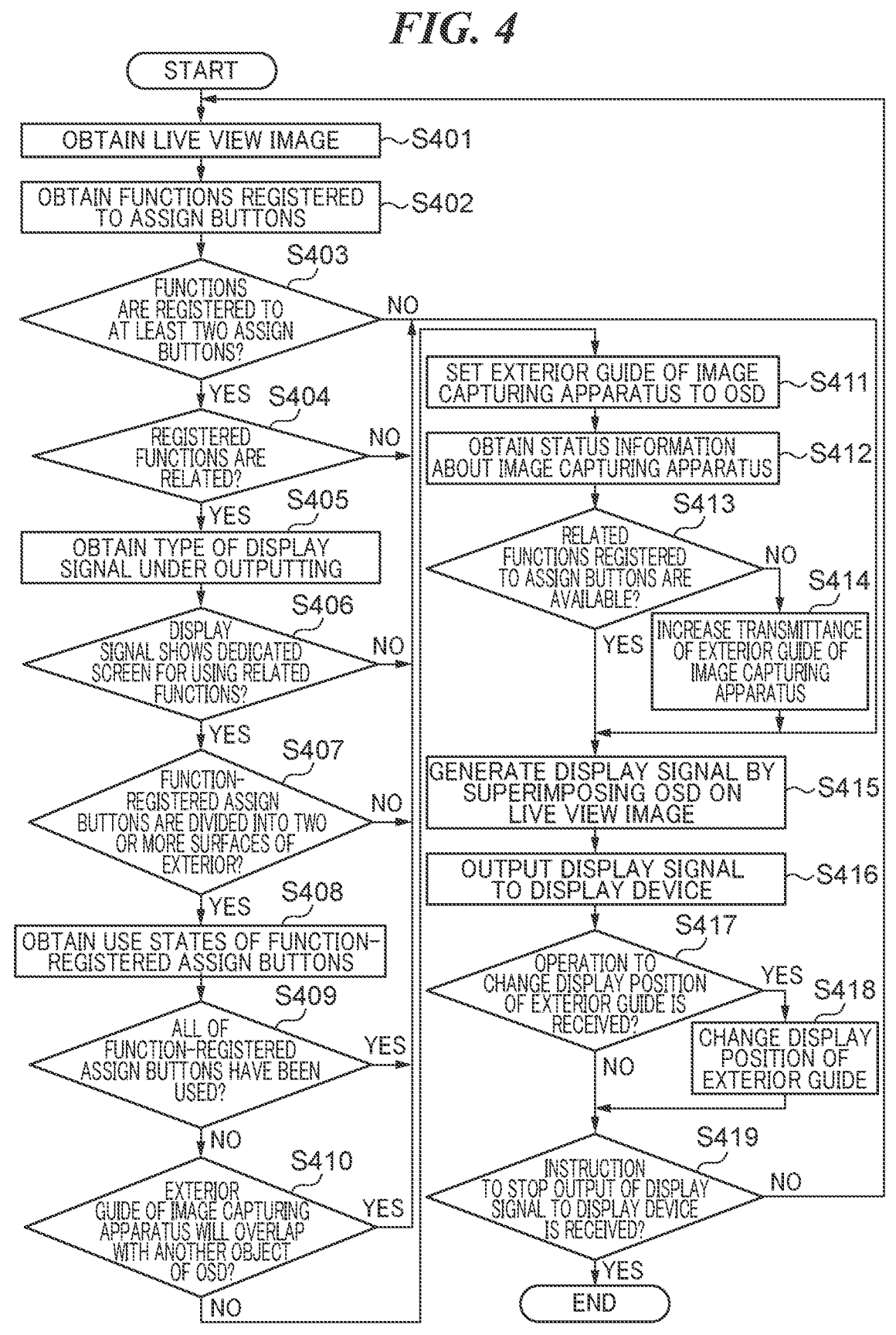

START

OBTAIN LIVE VIEW IMAGE ~S401

OBTAIN FUNCTIONS REGISTERED TO ASSIGN BUTTONS ~S402

S403
FUNCTIONS ARE REGISTERED TO AT LEAST TWO ASSIGN BUTTONS? — NO

YES    S404
REGISTERED FUNCTIONS ARE RELATED? — NO

YES    S405
OBTAIN TYPE OF DISPLAY SIGNAL UNDER OUTPUTTING

S406
DISPLAY SIGNAL SHOWS DEDICATED SCREEN FOR USING RELATED FUNCTIONS? — NO

YES    S407
FUNCTION-REGISTERED ASSIGN BUTTONS ARE DIVIDED INTO TWO OR MORE SURFACES OF EXTERIOR? — NO

YES    S408
OBTAIN USE STATES OF FUNCTION-REGISTERED ASSIGN BUTTONS

S409
ALL OF FUNCTION-REGISTERED ASSIGN BUTTONS HAVE BEEN USED? — YES

NO    S410
EXTERIOR GUIDE OF IMAGE CAPTURING APPARATUS WILL OVERLAP WITH ANOTHER OBJECT OF OSD? — YES

NO

SET EXTERIOR GUIDE OF IMAGE CAPTURING APPARATUS TO OSD ~S411

OBTAIN STATUS INFORMATION ABOUT IMAGE CAPTURING APPARATUS ~S412

S413
RELATED FUNCTIONS REGISTERED TO ASSIGN BUTTONS ARE AVAILABLE? — NO    S414

YES

INCREASE TRANSMITTANCE OF EXTERIOR GUIDE OF IMAGE CAPTURING APPARATUS

GENERATE DISPLAY SIGNAL BY SUPERIMPOSING OSD ON LIVE VIEW IMAGE ~S415

OUTPUT DISPLAY SIGNAL TO DISPLAY DEVICE ~S416

S417
OPERATION TO CHANGE DISPLAY POSITION OF EXTERIOR GUIDE IS RECEIVED? — YES    S418

NO

CHANGE DISPLAY POSITION OF EXTERIOR GUIDE

S419
INSTRUCTION TO STOP OUTPUT OF DISPLAY SIGNAL TO DISPLAY DEVICE IS RECEIVED? — NO

YES

END

*FIG. 6*

| Assign button function registration menu |
| --- |
| 1 Focus position 1 |
| 2 Focus position 2 |
| 3 Not registered |
| 4 Not registered |
| 5 Not registered |

*FIG. 8*

| Assign button function registration menu |
| --- |
| 1 Preset 1 Zoom position |
| 2 Preset 2 Zoom position |
| 3 Not registered |
| 4 Not registered |
| 5 Not registered |

FIG. 13A

| Joy stick function assignment menu | |
|---|---|
| 1 | Focus position 1 |
| 2 | Not assigned |

FIG. 13B

| Lever function assignment menu | |
|---|---|
| 1 | Focus position 2 |
| 2 | Not assigned |

FIG. 13C

| Control ring function assignment menu | |
|---|---|
| 1 | Focus position 3 |
| 2 | Not assigned |

FIG. 13D

| Dial function assignment menu | |
|---|---|
| 1 | Focus position 4 |
| 2 | Not assigned |

IMAGE CAPTURING APPARATUS, CONTROL METHOD THEREFOR, STORAGE MEDIUM STORING CONTROL PROGRAM THEREFOR, AND IMAGE CAPTURING SYSTEM

BACKGROUND OF THE INVENTION

Field of the Invention

The present invention relates to an image capturing apparatus, a control method therefor, a storage medium storing a control program therefor, and an image capturing system.

Description of the Related Art

Some imaging apparatuses, such as digital video cameras and digital cameras, are provided with an assign button as an operation member capable of registering a predetermined function. A user of an image capturing apparatus provided with an assign button can easily and quickly activate a desired function by registering a frequently used function to the assign button and operating the assign button during use of the image capturing apparatus (see, for example, Japanese Laid-Open Patent Publication (Kokai) No. 2016-167723 (JP 2016-167723A).

When an image capturing apparatus is provided with a plurality of assign buttons, related functions may be registered to the respective assign buttons. In this case, a user may forget or cannot grasp the functions registered to the assign buttons. When such a situation occurs, the user can confirm the functions registered to the assign buttons by opening a menu screen used in registering the functions to the assign buttons.

However, the method of confirming the functions registered to the assign button using the menu screen needs to switch a live view screen that is displaying to the menu screen. Therefore, a user cannot confirm the functions registered to the respective assign buttons during live view display and operate the assign buttons to which the desired functions are registered.

SUMMARY OF THE INVENTION

The present invention provides an image capturing apparatus capable of improving, in live view display, operability of operation members to which related functions are registered.

Accordingly, an aspect of the present invention provides an image capturing apparatus including an image capturing unit, a display device that displays a live view image obtained by the image capturing unit, operation members, a registration unit configured to respectively register predetermined functions to at least two operation members among the operation members, and a control unit configured to display an exterior guide of the image capturing apparatus showing an exterior surface of the image capturing apparatus on which the at least two operation members are arranged together with the live view image on the display device in a case where related functions are registered to the at least two operation members.

According to the present invention, the operability, in live view display, of operation members to which related functions are registered is improved.

Further features of the present invention will become apparent from the following description of exemplary embodiments with reference to the attached drawings.

BRIEF DESCRIPTION OF THE DRAWINGS

FIG. 1 is a block diagram showing a schematic configuration of an image capturing apparatus according to a first embodiment.

FIG. 2 is a block diagram showing a schematic configuration of an extension unit.

FIG. 4 is a flowchart showing an image capturing operation performed by the image capturing apparatus according to the first embodiment.

FIG. 6 is a view showing examples of functions registered to the assign buttons in the first embodiment.

FIG. 8 is a view showing an example of preset registration to the assign buttons in the first embodiment.

FIG. 13A, FIG. 13B, FIG. 13C, and FIG. 13D are views showing examples of functions registered to the operation members in the second embodiment.

DESCRIPTION OF THE EMBODIMENTS

Figure 3A:
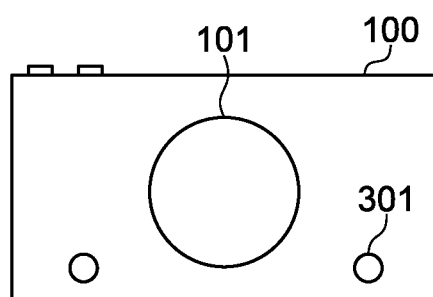
FIG. 3A, FIG. 3B, FIG. 3C, and FIG. 3D are views showing examples of arrangement positions of assign buttons in the image capturing apparatus according to the first embodiment.

Hereafter, embodiments according to the present invention will be described in detail by referring to the drawings. An image capturing system including an image capturing apparatus and an extension unit that is attachable to and detachable from the image capturing apparatus will be described.

Figure 1:
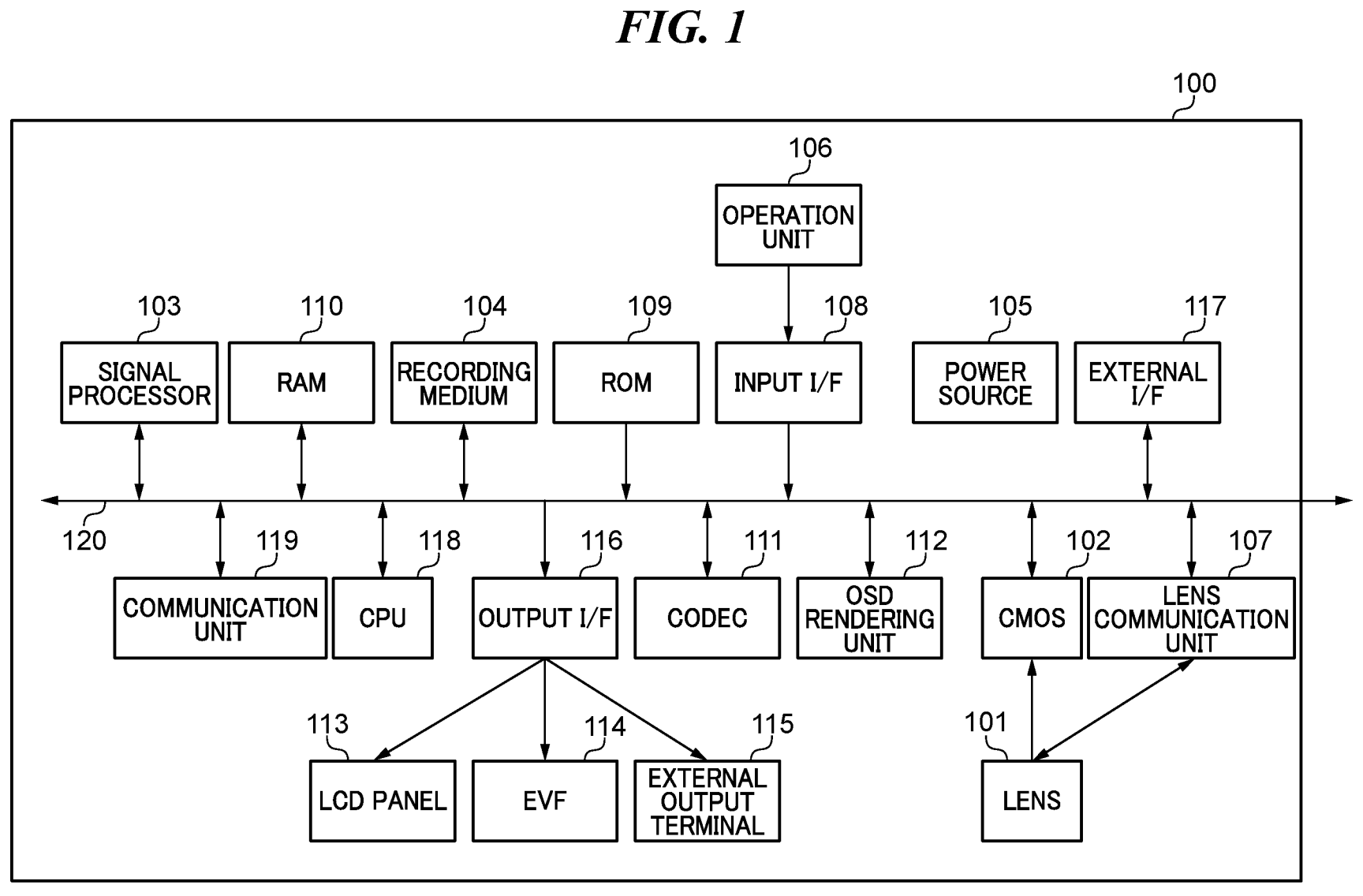

FIG. 1 is a block diagram showing the image capturing apparatus 100 according to a first embodiment. Specifically, the image capturing apparatus 100 is a video camera. The image capturing apparatus 100 includes a lens 101, a CMOS sensor 102, a signal processor 103, a recording medium 104, a power source 105, an operation unit 106, a lens communication unit 107, and an input I/F 108, a ROM 109, and a RAM 110. In addition, the image capturing apparatus 100 includes a CODEC 111, an OSD (On Screen Display) rendering unit 112, an LCD panel 113, an EVF (Electric View Finder) 114, an external interface 115, an interface I/F 116, an external interface I/F 117, a CPU 118, and a communication unit 119. These units constituting the image capturing apparatus 100 are communicably connected via a data bus 120 as shown in FIG. 1.

The CPU 118 develops various programs stored in the ROM 109 to the RAM 110 and runs them to comprehensively control operations of the respective units constituting the image capturing apparatus 100. The ROM 109 stores various programs to be executed by the CPU 118, various parameters necessary for executing the programs, etc. The RAM 110 has a work area for the CPU 118 to develop a program and a storage area for temporarily storing video data etc.

The lens 101 and the CMOS sensor 102 constitute an image capturing unit. The lens 101 includes a focus lens, a zoom lens, a diaphragm mechanism, etc. and focuses an incident light on the CMOS sensor 102. The CMOS sensor 102, which is an example of an image sensor, of the image capturing apparatus 100 includes an A/D converter, converts an optical image formed by the lens 101 into an analog electric signal, converts the analog electric signal into a digital signal, and outputs the digital signal to the signal processor 103. The image sensor is not limited to a CMOS and may be a CCD etc.

The signal processor 103 applies signal processes, such as resizing processes, such as pixel interpolation and reduction, a white balance process, and a color conversion to the digital signal transmitted from the CMOS sensor 102. The digital signal processed by the signal processor 103 is transmitted to the CODEC 111. The CODEC 111 compresses and encodes the digital signal transmitted from the signal processor 103 at a predetermined bit rate and format. In addition, the CODEC 111 decodes and reproduces the compression-coded images (frames constituting video) and audio recorded in the RAM 110 or the recording medium 104. The reproduced images are displayed on the LCD panel 113, the EVF 114, or an external monitor (not shown) connected to the external output terminal 115.

The recording medium 104 stores captured video, metadata, and audio data associated with the captured video. The power source 105 is a battery or an AC power source, and supplies necessary power to each unit of the image capturing apparatus 100.

The operation unit 106 includes a power switch that performs on/off control of the power source 105 of the image capturing apparatus 100, a menu display button, a cross key, assign buttons capable of registering desired functions, and a pointing device such as a touch panel. The touch panel is disposed on the screen of the LCD panel 113 and functions integrally with the LCD panel 113.

The assign buttons are mounted on the image capturing apparatus 100, and a function desired by the user can be registered in each of the assign buttons. The functions registered to the assign buttons are stored in both the ROM 109 and the RAM 110 or one of them. Operation information accepted by the operation unit 106 is input to the CPU 118 and the external I/F 117 through the input I/F 108 and the data bus 120.

The lens communication unit 107 obtains information, such as a configuration, mounting information, a focus position, and an angle of view, of the lens 101 from the lens 101, and transmits the information to the CPU 118. Further, the lens communication unit 107 controls the operation of the lens 101 based on a command from the CPU 118.

The OSD rendering unit 112 renders an OSD including a character string representing a state or a setting of the image capturing apparatus 100, icons, various frames or markers, or a menu for performing various settings in the VRAM on the RAM 110. Resource data of characters and icons constituting the OSD are stored in the ROM 109, and the OSD rendering unit 112 reads predetermined resource data from the ROM 109 and renders it in the VRAM.

The output I/F 116 outputs the image output from the signal processor 103 and the OSD generated by the CPU 118 to the LCD panel 113, the EVF 114, the external output terminal 115, and the external I/F 117. The output I/F 116 includes a mixer circuit, and can output an image on which the OSD is superimposed, and can also output a signal resized in accordance with each output destination. At this time, the same OSD or different OSDs can be displayed on the respective output destinations.

The LCD panel 113 is a display device that displays a live view image, captured video, a menu screen, etc. The EVF 114 is a display device that is provided in the finder and displays a live view image (live view video) or the like output from the signal processor 103. The external output terminal 115 satisfies the standards of SDI and HDMI (registered trademark), and outputs the video signal or the like generated by the signal processor 103 to an external monitor.

The external I/F 117 is an interface that allows an external device (e.g., the extension unit 200 (see FIG. 2)) to be mounted thereon, and inputs and outputs a display signal, an audio signal, and a control signal to and from the extension unit 200. The communication unit 119 transmits and receives a video signal, an audio signal, and other various types of information to and from an external device communicably connected by a wireless method or a wired method.

Figure 2:
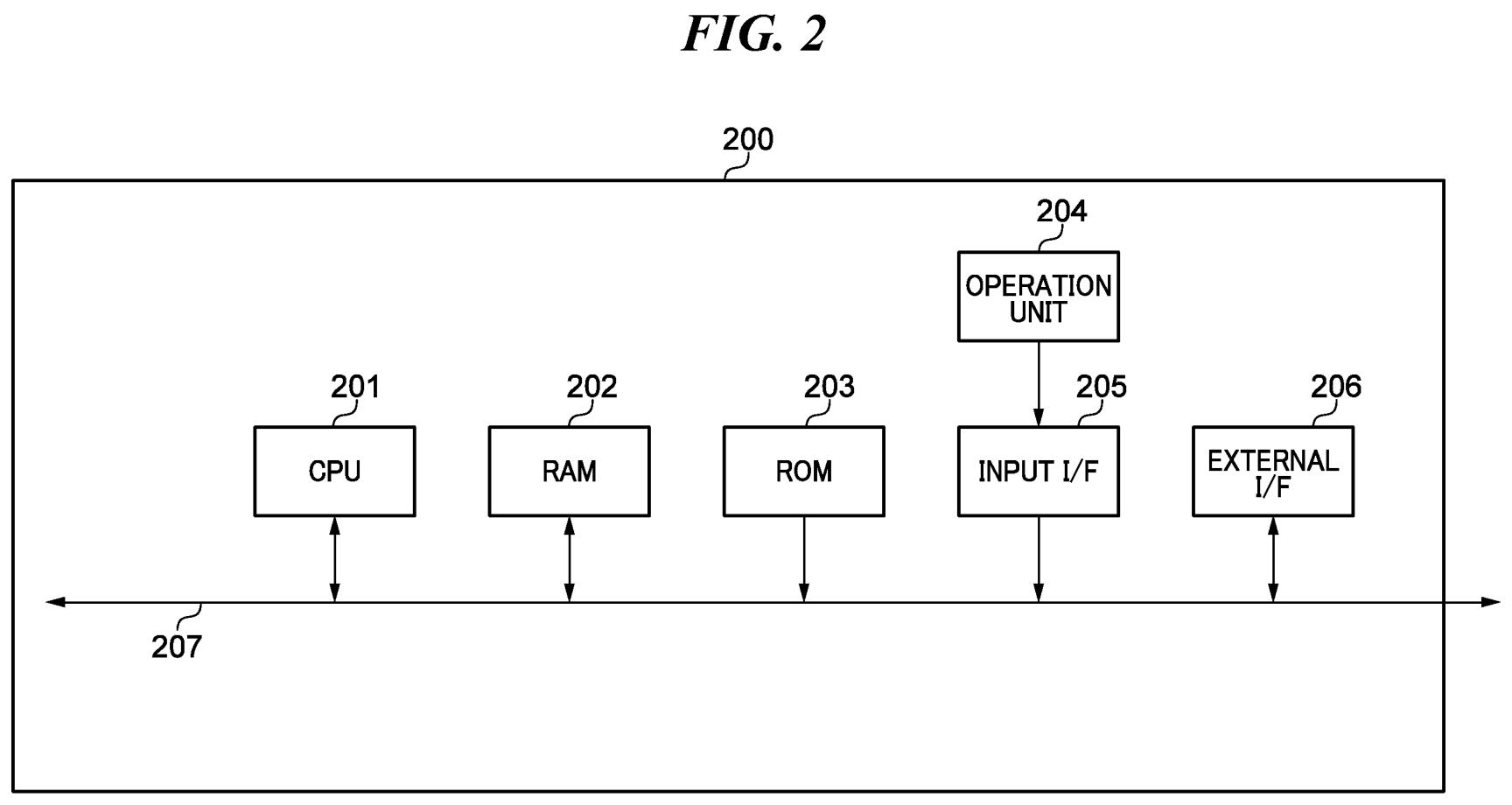

FIG. 2 is a block diagram showing the extension unit 200 that is detachable from the image capturing apparatus 100.

The extension unit 200 is connectable not only to the image capturing apparatus 100 but also to other extension units, and enables function extension of the image capturing apparatus 100. In this embodiment, the function extension of the image capturing apparatus 100 is not limited to addition of a function that is not included in the image capturing apparatus 100, and includes improvement of performance of a function included in the image capturing apparatus 100.

As shown in FIG. 2, the extension unit 200 includes a CPU 201, a RAM 202, a ROM 203, an operation unit 204, an input I/F 205, and an external I/F 206, which are mutually communicable via a data bus 207.

The CPU 201 develops various programs stored in the ROM 203 onto the RAM 202 and runs them to comprehensively control operations of the respective units constituting the extension unit 200. The ROM 203 stores the various programs to be executed by the CPU 201, various parameters necessary for executing the programs, etc. The RAM 202 has a work area for the CPU 201 to develop a program and a storage area for temporarily storing video data etc.

The operation unit 204 has assign buttons as operation members. Functions registered to the assign buttons are stored in both or one of the ROM 109 and the RAM 110 of the image capturing apparatus 100. Since functions of the input I/F 205 and the external I/F 206 are equivalent to the functions of the input I/F 108 and the external I/F 117 of the image capturing apparatus 100, descriptions thereof are be omitted. The extension unit 200 may include a display device like an LCD panel.

An attachment form of the extension unit 200 to the image capturing apparatus 100 is not particularly limited. For example, a connector of the external I/F 117 of the image capturing apparatus 100 may be mechanically directly connected to a connector of the external I/F 206 of the extension unit 200 so that the extension unit 200 will be mechanically communicably coupled to the image capturing apparatus 100. In addition to the connectors, the image capturing apparatus 100 and the extension unit 200 may be provided with fitting portions or mechanical fixing portions using screws for stabilizing a coupling state. In the meantime, the extension unit 200 is not limited to the structure that is mechanically attached to the image capturing apparatus 100 and integrated with the image capturing apparatus 100, and may be used as a separate structure from the image capturing apparatus 100. The communication connection between the image capturing apparatus 100 and the extension unit 200 may be a direct connection between the connectors, a wired connection using a cable, or a short-range wireless communication connection such as Bluetooth (registered trademark).

Another extension unit may be connected to the extension unit 200 connected to the image capturing apparatus 100 via the external I/F 206. As a result, functions of extension units including the extension unit 200 can be added to the image capturing apparatus 100 or the performance of functions provided in the image capturing apparatus 100 can be improved.

Next, a configuration that displays an exterior guide of the image capturing apparatus 100 on the display device such as the LCD panel 113 will be described. In the exterior guide, assign buttons to which related functions are registered are highlighted.

Figure 3B:
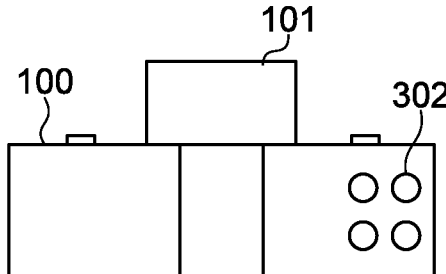
Figure 3C:
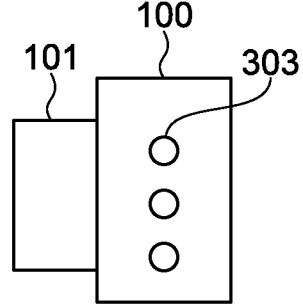
Figure 3D:
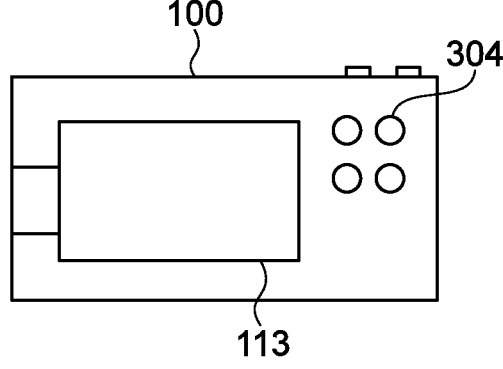

FIG. 3A, FIG. 3B, FIG. 3C, and FIG. 3D are views showing arrangement positions of assign buttons 301, 302, 303, and 304 in the image capturing apparatus 100. FIG. 3A is a front view, FIG. 3B is a top view, FIG. 3C is a side view, and FIG. 3D is a rear view. As shown in FIG. 3A to FIG. 3D, the two assign buttons 301 are provided on a front surface of a main body (housing) of the image capturing apparatus 100, the four assign buttons 302 are provided on an upper surface, the three assign buttons 303 are provided on a left surface, and the four assign buttons 304 are provided on a back surface. Illustration and description of arrangement of assign buttons of the operation unit 204 included in the extension unit 200 will be omitted.

FIG. 4 is a flowchart showing an image capturing operation performed in the image capturing apparatus 100. Each process (step) indicated by an S number in this flowchart is achieved by the CPU 118 developing a program stored in the ROM 109 onto the RAM 110 and running it to comprehensively controlling operations of the respective units constituting the image capturing apparatus 100.

In S401, the CPU 118 obtains a live view image. The live view image may be an image before capturing (before starting recording) for the purpose of checking an object or an image during capturing.

In S402, the CPU 118 obtains function registration contents to the assign buttons mounted on the image capturing apparatus 100. As described above, the function registration contents to the assign buttons are stored in the ROM 109 or the RAM 110. In a case where the extension unit 200 is connected to the image capturing apparatus 100, the CPU 118 obtains the function registration contents to the assign buttons of the image capturing apparatus 100 and the assign buttons of the extension unit 200.

In S403, the CPU 118 determines whether functions are registered to at least two assign buttons mounted on the image capturing apparatus 100 based on the function registration contents to the assign buttons obtained in S402. When determining that the functions are registered to at least two assign buttons (Yes in S403), the CPU 118 executes a process in S404. When determining that there is one or less assign buttons to which a function is registered (No in S403), the CPU 118 executes a process in S415. In the case where the extension unit 200 is connected to the image capturing apparatus 100, the CPU 118 determines whether functions are registered to at least two assign buttons among the assign buttons of the image capturing apparatus 100 and the assign buttons of the extension unit 200.

In S404, the CPU 118 determines whether the functions registered to the at least two assign buttons are related functions. When determining that the functions are related (Yes in S404), the CPU 118 executes a process in S405. When determining that the functions are not related (No in S404), the CPU 118 executes the process in S415.

In S405, the CPU 118 obtains a type of a display signal under outputting from the output I/F 116. The type of the display signal means a combination state of image data and an OSD, and is a type of a screen displayed on the LCD panel 113 and the EVF 114. The type of the display signal is a type of a screen displayed on the external monitor in the case where the display signal is transmitted to the external monitor via the external output terminal 115. Further, when the extension unit 200 includes a display device and a display signal is transmitted to the extension unit 200 via the external I/F 117, the type of the display signal is a type of a screen displayed on the extension unit 200.

In S406, the CPU 118 determines whether the type of the display signal obtained in S405 means a dedicated screen for using the related functions determined in S404. When determining that the type of the display signal means the dedicated screen (Yes in S406), the CPU 118 executes a process in S407. When determining that the type of the display signal does not mean the dedicated screen (No in S406), the CPU 118 executes the process in S415. The process in S406 can be omitted (can be skipped and proceed to the next step). If the process in S406 is omitted, the process proceeds to S407 on the assumption that the type of the display signal does not mean the dedicated screen (means a normal screen described later).

Figure 5A:
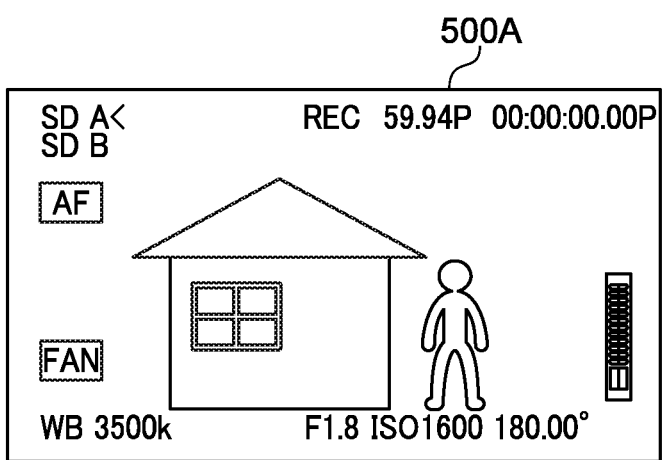
FIG. 5A and FIG. 5B are views showing examples of a normal screen displayed on a display device in the first embodiment.
Figure 5B:
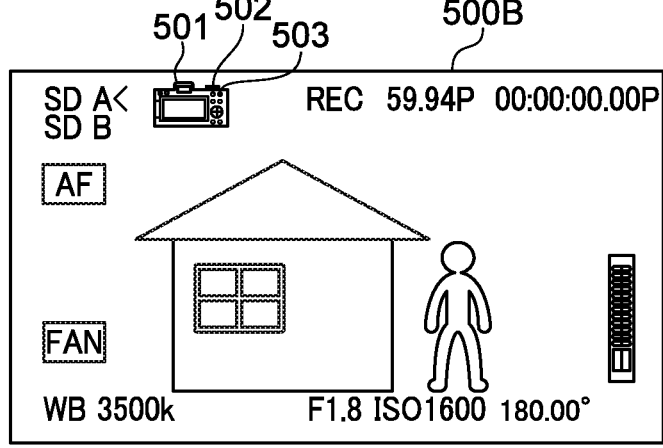
Figure 7A:
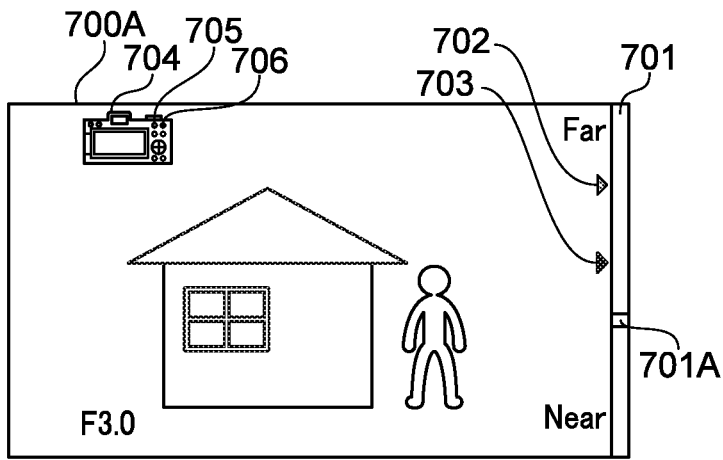
FIG. 7A, FIG. 7B, and FIG. 7C are views showing examples of dedicated screens displayed on the display device in the first embodiment.
Figure 7B:
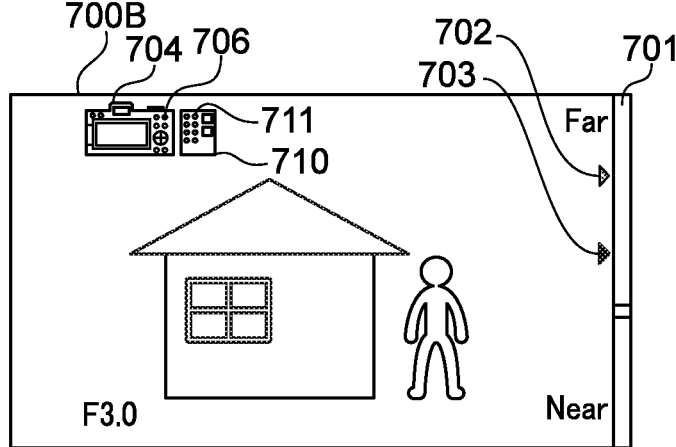
Figure 7C:
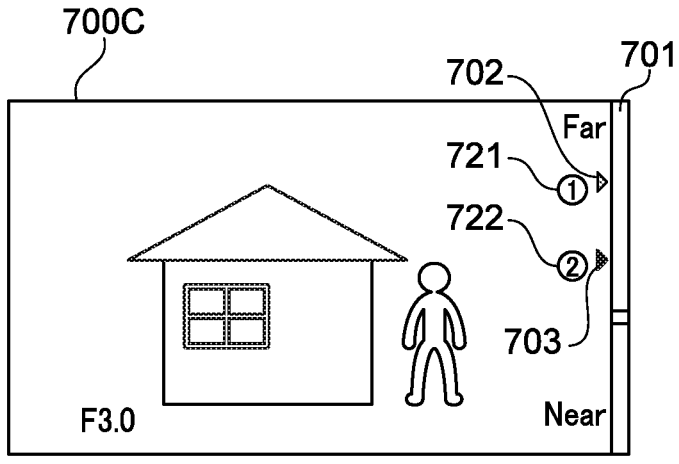

The dedicated screen will now be briefly described. The dedicated screen is a screen in which an OSD is superimposed on a live view image. The OSD visually displays the related functions registered to the assign buttons and displays the setting contents and use states thereof so as to be recognizable by a user. Before starting the process in S401, the user of the image capturing apparatus 100 can operate the menu screen of the image capturing apparatus 100 to set whether to display a dedicated screen for predetermined functions on the LCD panel 113 etc. when the functions are registered to assign buttons. The dedicated screen is displayed on the LCD panel 113 etc. when a preset function of displaying the dedicated screen when predetermined functions are registered to the assign buttons is enabled. When the dedicated screen is not set to be displayed, the normal screen is displayed. Examples of the dedicated screens are shown in FIG. 7A, FIG. 7B, and FIG. 7C described later, and examples of the normal screens are shown in FIG. 5A and FIG. 5B described later.

In S407, the CPU 118 determines whether the assign buttons to which the related functions are registered (the function-registered assign buttons) are divided into two or more surfaces of the exterior of the image capturing apparatus 100. Here, two or more surfaces of the exterior of the image capturing apparatus 100 means, for example, two or more surfaces among the four surfaces shown in FIG. 3A to FIG. 3D. In the case where the extension unit 200 is connected to the image capturing apparatus 100, the CPU 118 determines whether each of the image capturing apparatus 100 and the extension unit 200 has assign buttons to which related functions are registered. Further, the CPU 118 determines whether the assign buttons to which the related functions are registered are divided into two or more surfaces of the exterior of the extension unit 200. When determining that the positions of the assign buttons to which the related functions are registered are divided into two or more surfaces (Yes in S407), the CPU 118 executes a process in S408. In the meantime, when determining that the assign buttons to which the related functions are registered are disposed on only one surface (No in S407), the CPU 118 executes the process in S415. The process in S407 can be omitted.

In S408, the CPU 118 obtains the use states of at least two assign buttons to which the related functions are registered.

In S409, the CPU 118 determines whether all of the assign buttons to which the related functions are registered have been used based on the use states of the assign buttons obtained in S408. The determination in S409 is performed for each exterior surface of the image capturing apparatus 100. In the case where the extension unit 200 is connected to the image capturing apparatus 100, the determination in S409 is individually performed for each of the image capturing apparatus 100 and the extension unit 200. When determining that all of the assign buttons to which the related functions are registered have been used (Yes in S409), the CPU 118 executes the process in S415. The reason for this is as follows. That is, when all of the assign buttons to which the related functions are registered are used, it is estimated that the user knows registration states of the related functions registered to the assign buttons. Therefore, it is considered that there is no need to display the exterior guide described later on the LCD panel 113 etc. In the meantime, when determining that not all of the assign buttons to which the related functions are registered are used (No in S409), the CPU 118 executes a process in S410. The process in S409 can be omitted.

In S410, the CPU 118 determines whether the exterior guide of the image capturing apparatus 100 will overlap with another object (a display item) of the OSD when the appearance guide will be displayed on the LCD panel 113 etc. Note that the "exterior guide of the image capturing apparatus 100" is a schematic exterior of both or one of the image capturing apparatus 100 and the extension unit 200 in which assign buttons to which related functions are registered are highlighted. The "LCD panel 113 etc." include the LCD panel 113, the EVF 114, and the external monitor that receives the display signal via the external terminal 115. When the extension unit 200 includes a display device, the "LCD panel 113 etc." include the display device of the extension unit 200.

When determining that the exterior guide will not overlap with another object (No in S410), the CPU 118 performs a process in S411. When determining that the exterior guide will overlap with another object (Yes in S410), the CPU 118 performs the process in S415. The process in S410 can be omitted. Further, as described above, it is also possible to display OSDs having different contents on the respective output destinations, such as the LCD panel 113 etc. Therefore, the determination in S410 may be performed for each of the image capturing apparatus 100, the external monitor, and the extension unit 200.

In S411, the CPU 118 controls the OSD rendering unit 112 to set the exterior guide of the image capturing apparatus 100 to the OSD. The content of the OSD may be generated for each of the LCD panel 113 etc. that are output destinations of the display signal from the output I/F 116. Alternatively, the OSD may be set by using numbers respectively registered to the assign buttons instead of the exterior guide of the image capturing apparatus 100. The numbers of the assign buttons may be set as default values or may be set by a user operation on the menu screen.

In S412, the CPU 118 obtains status information about the image capturing apparatus 100. The status information about the image capturing apparatus 100 includes an operation state of the image capturing apparatus 100, a configuration and mounting state of the lens 101, a focus position, and an angle of view that can be obtained from the lens communication unit 107, but is not limited thereto.

In S413, the CPU 118 determines whether the related functions registered to the assign buttons are available based on the status information about the image capturing apparatus 100 obtained in S412. When determining that the related functions are unavailable (No in S413), the CPU 118 executes the process in S414. When determining that the related functions are available (Yes in S413), the CPU 118 executes the process in S415. The process in S413 can be omitted.

In S414, the CPU 118 controls the OSD rendering unit 112 to increase the transmittance of the exterior guide of the image capturing apparatus 100 set in S411, and then executes the process in S415. Although the transmittance of the exterior guide of the image capturing apparatus 100 is increased here, the exterior guide may be erased. The process in S414 can be omitted.

In S415, the CPU 118 generates a display signal (output video) in which the OSD generated by the OSD rendering unit 112 in S411 is superimposed on the live view image being obtained.

In S416, the CPU 118 outputs the display signal generated in S415 to the LCD panel 113, the EVF 114, and the external terminals 115 via the output I/F 116. As a result, the output image is displayed on the LCD panel 113, the EVF 114, or the external monitor connected to the external outputting terminals 115 via the output I/F 116. When the extension unit 200 includes a display unit, the display signal is also output to the extension unit 200 via the external I/F 117, and the output video is also displayed on the display device of the extension unit 200.

In S417, the CPU 118 determines whether an operation to change the display position of the exterior guide of the image capturing apparatus 100 is received through the operation unit 106. When determining that the operation to change the display position is received (Yes in S417), the CPU 118 executes a process in S418. When determining that the operation to change the display position is not received (No in S417), the CPU 118 executes a process in S419. When the process proceeds to S417 without going through the process in S411, the determination result in S417 becomes always "No" because the exterior guide of the image capturing apparatus 100 is not displayed.

In S418, the CPU 118 transmits change information (coordinate information) about a display position of the exterior guide of the image capturing apparatus 100 to the OSD rendering unit 112. The OSD rendering unit 112 changes the display position of the exterior guide in the OSD based on the received change information. At this time, the change destination of the display position of the exterior guide may be included in an area where another object is already displayed. In this case, the exterior guide is not displayed in consideration of the fact that the result of the determination in S410 performed after returning the process to S401 because of continuing to obtain the live view image is "Yes". The exterior guide may be displayed at the original display position instead of erasing.

In S419, the CPU 118 determines whether an instruction to stop output of the display signal from the output I/F 116 is received via the operation unit 106. The instruction to stop output of the display signal may be an operation of turning off the power source 105 of the imaging apparatus 100 or an operation of ending obtainment of the live view image. When determining that the instruction to stop output of the display signal has been received (Yes in S419), the CPU 118 ends the present process. When determining that the instruction to stop output of the display signal is not received (No in S419), the CPU 118 returns the process to S401.

Next, examples of screens displayed on the LCD panel 113 etc. will be described according to the flowchart in FIG. 4.

FIG. 5A and FIG. 5B are views showing examples of normal screens displayed on the LCD panel 113 etc. of the image capturing apparatus 100. The normal screen 500A in FIG. 5A is an example of a screen displayed when the determination result in S406 becomes "No" and the process proceeds from S406 to S415. Since the process directly proceeds from S406 to S415, the process in S411 is not executed, and thus the exterior guide of the image capturing apparatus 100 is not displayed in the normal screen 500A. The OSD displayed on the normal screen 500A includes objects of operation information and various set values (parameters) of the imaging apparatus 100, such as a recording icon (REC), an aperture value (F1.8), and an ISO sensitivity (ISO1600), as shown in FIG. 5A.

In the meantime, the normal screen 500B shown in FIG. 5B is an example of a screen displayed when the determinations in S406 and S407 are omitted and the determination result in S409 is "No" or the determination in S409 is omitted, the determination result in S410 is "No", and determination result in S413 is "Yes". In this case, in the normal screen 500B, the exterior guide 501 of the image capturing apparatus 100 is displayed in a free space of the OSD in the normal screen 500A.

In the exterior guide 501, the first assign button 502 and the second assign button 503 to which the related functions are registered are displayed in an emphasized manner. For example, the buttons may be painted by different colors (red, blue, green, etc.). The first assign button 502 and the second assign button 503 in the exterior guide 501 correspond to the upper two buttons of the four assign buttons 304 (see FIG. 3D) provided on the back surface of the image capturing apparatus 100.

When the determination results other than the determination result in S410 are the same as the determination results in the case where the normal screen 500B is displayed and when the determination result in S410 is "Yes", the exterior guide 501 is not displayed because the process in S411 is not performed. As a result, in this case, the same screen as the normal screen 500A is displayed on the LCD panel 113 etc.

As described above (see S417), the display position of the exterior guide can be changed. When a drag operation for changing the display position of the exterior guide 501 is performed on the normal screen 500B and another object is arranged at the change destination of the display position in the OSD, the exterior guide is not displayed. This is because even if the process proceeds from S417 to S418, the process in S411 is not performed because the determination result in S410 becomes "Yes" after the process is subsequently returned to S401. Instead of such a non-display process of the exterior guide 501, a process for redisplaying the exterior guide 501 at the original position before the drag operation may be performed.

FIG. 6 is a view showing examples of functions registered to the first assign button 502 and the second assign button 503 corresponding to the exterior guide 501 in FIG. 5B. FIG. 6 shows that a first focus position 1 is registered to the first assign button 502 mounted on the image capturing apparatus 100 and a second focus position 2 is registered to the second assign button 503. A focus position is an example of a function that can be registered to an assign button, and a function that can be registered to an assign button is not limited to a focus position.

The objects corresponding to the functions respectively registered to the first assign button 502 and the second assign button 503 are not displayed on a normal screen, such as the normal screen 500B, but are displayed on a dedicated screen as described below.

FIG. 7A, FIG. 7B, and FIG. 7C are views showing examples of dedicated screens displayed on the LCD panel 113 etc. of the imaging device 100.

The dedicated screen 700A in FIG. 7A is an example of a screen displayed in a case where the determination result in S406 is "Yes", the determination in S407 is omitted, the determination result in S409 is "No" or the determination in S409 is omitted, the determination result in S410 is "No", and the determination result in S413 is "Yes". On the dedicated screen 700A, an exterior guide 704 of the image capturing apparatus 100 is displayed. A first assign button 705 and a second assign button 706 to which related functions are registered are displayed in the exterior guide 704. The first assign button 705 and the second assign button 706 in the exterior guide 704 correspond to the upper two buttons of the four assign buttons 304 (see FIG. 3) provided on the back surface of the image capturing apparatus 100.

Here, the focus positions shall be set to the first assign button 705 and the second assign button 706 in the exterior guide 704 as shown in FIG. 6. The first assign button 705 and the second assign button 706 should be highlighted in the exterior guide 704 so that the user can easily visually recognize and distinguish the first assign button 705 and the second assign button 706. For example, the first assign button 705 is displayed in red and the second assign button 706 is displayed in blue.

The OSD of the dedicated screen 700A includes objects that visually display the functions registered to the first assign button 705 and the second assign button 706. Specifically, a focus meter 701, a first marker 702 indicating the first focus position 1, and a second marker 703 indicating the second focus position 2 are displayed on the dedicated screen 700A. The focus meter 701 visually represents a focus position (near to far) that can be taken by the image capturing apparatus 100, and an indicator 701A is displayed at the current focus position. The first marker 702 is displayed at a position indicating the first focus position 1 with respect to the focus meter 701, and the second marker 703 is displayed at a position indicating the second focus position 2 with respect to the focus meter 701.

At this time, the first marker 702 is displayed in red corresponding to the red display of the first assign button 705, and the second marker 703 is displayed in blue corresponding to the blue display of the second assign button 706. Thus, the user can easily recognize the relationships between the assign buttons and the markers. For example, when the user wants to move the focus position from the current position to the first focus position 1 displayed in red, the user can quickly determine that the user should operate the assign button 304 corresponding to the first assign button 705 displayed in red. When the assign button 304 corresponding to the first assign button 705 is pressed, the lens 101 is driven to the first focus position 1, and the indicator 701A moves to the position indicated by the first marker 702 in accordance with the driving of the lens 101.

In the dedicated screen 700A, since information related to the assign buttons is preferentially displayed, the objects, such as "REC" and "ISO1600", displayed on the normal screens 500A and 500B are not displayed.

A dedicated screen 700B shown in FIG. 7B is an example of a screen displayed when the determination result in S406 is "Yes", the determination result in S407 is "Yes" or the determination in S407 is omitted, the determination result in S409 is "No" or the determination in S409 is omitted, the determination result in S410 is "No", and the determination result in S413 is "Yes". On the dedicated screen 700B, the exterior guide 704 of the image capturing apparatus 100, the focus meter 701, the first marker 702, and the second marker 703 are displayed as with the dedicated screen 700A. In addition to these, an exterior guide 710 of the extension unit 200 is displayed. The exterior guides 704 and 710 are generated by the OSD rendering unit 112 in the S411 and are superimposed and displayed on the live view image.

There is no difference between the dedicated screen 700A and the dedicated screen 700B in that the second focus position 2 is registered to the second assign button 706 of the exterior guide 704 of the image capturing apparatus 100 and the second marker 703 corresponds to the second focus position 2. The dedicated screen 700B shows a state where the first focus position 1 is registered to one of the assign buttons mounted on the extension unit 200 (hereinafter referred to as a "third assign button 711" for convenience). For example, the second assign button 706 and the second marker 703 are displayed in blue, and the third assign button 711 and the first marker 702 are displayed in red.

In this way, when it is determined that the assign buttons to which the related functions are registered are divided into the image capturing apparatus 100 and the extension unit 200 in S407, the exterior guides are generated for the respective surfaces and are superimposed and displayed on the live view image. When the dedicated screen 700B is displayed on the LCD panel 113 etc., the user can easily recognize the relationships between the assign buttons and the markers as with the case where the dedicated screen 700A is displayed.

In a case where the process of the flowchart in FIG. 4 is returned to S401 after displaying the dedicated screen 700B, based on the determination result of S409, for example, when it is determined in S409 that the second assign button 706 is used, the exterior guide 704 is not displayed. When the assign buttons to which the related functions are registered are divided into a plurality of surfaces of the image capturing apparatus 100, exterior guides representing the respective surfaces are displayed (not shown). For example, when the assign buttons are divided into the front surface and the upper surface of the image capturing apparatus 100, exterior guides corresponding to FIG. 3A and FIG. 3B are displayed.

When the extension unit 200 includes the display device, the display signal for the image capturing apparatus 100 and the display signal for the extension unit 200 may be generated separately in S415. In this case, the OSD for the image capturing apparatus 100 is generated so as to exclude the exterior guide 710 and the first marker 702 of the extension unit 200, and the OSD for the extension unit 200 is generated so as to exclude the exterior guide 704 and the second marker 703 of the image capturing apparatus 100.

As described above, in response to a user operation on the menu screen, an OSD may be generated using numbers individually registered to the assign buttons instead of the exterior guide of the image capturing apparatus 100. In a dedicated screen 700C in FIG. 7C, the numbers assigned to the respective assign buttons are displayed instead of the exterior guide of the image capturing apparatus 100.

The dedicated screen 700C in FIG. 7C is an example of a screen displayed when the determination result in S406 is "Yes", the determination result in S407 is "Yes" or the determination in S407 is omitted, the determination result in S409 is "No" or the determination in S409 is omitted, the determination result in S410 is "No", and the determination result in S413 is "Yes". The number that is formed by surrounding a numeral "1" by a circle shall be given to the first assign button mounted on the image capturing apparatus 100, and the number that is formed by surrounding a numeral "2" by a circle shall be given to the second assign button. Moreover, the focus positions shall be set to the first assign button and the second assign button as shown in FIG. 6.

In the dedicated screen 700C, a number 721 that is formed by surrounding a numeral "1" by a circle is displayed adjacent to the first marker 702, and a number 722 that is formed by surrounding a numeral "2" by a circle is displayed adjacent to the second marker 703. That is, in this example, the numbers 721 and 722 are set to the OSD instead of the exterior guide in S411. When the dedicated screen 700C is displayed on the LCD panel 113 etc., the user can easily recognize the relationships between the assign buttons and the markers as with the case where the dedicated screen 700A is displayed. The display of the numbers of the assign buttons are not limited to the numbers 721 and 722 that are formed by surrounding the numerals by the circles. The first assign button and the second assign button may be arranged on the same surface of the image capturing apparatus 100, may be arranged on different surfaces, or may be separately arranged on the image capturing apparatus 100 and the extension unit 200.

The case where the focus positions are registered to the assign buttons of the image capturing apparatus 100 has been described above. Next, a case where preset zoom positions are registered to assign buttons of the image capturing apparatus 100 will be described.

FIG. 8 is a view showing an example of a preset zoom position registration for assign buttons of the image capturing apparatus 100. Here, a zoom position of preset 1 is registered to the first assign button 1, and a zoom position of preset 2 is registered to the second assign button 2. In the present embodiment, the preset is a function of calling and operating a registered content by registering a zoom position, a focus position, etc. in advance. For example, when the first assign button 1 is pressed (operated), the lens 101 is driven to the zoom position of the preset 1.

Figure 9A:
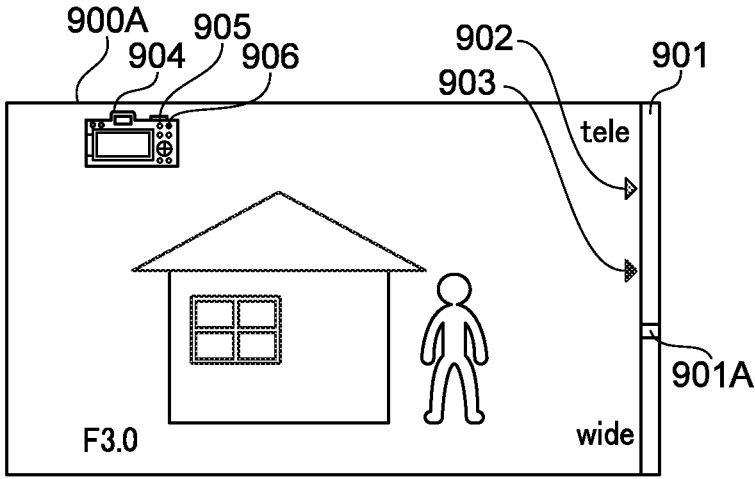
FIG. 9A and FIG. 9B are diagrams showing another example of the dedicated screen displayed on the display device in the first embodiment.
Figure 9B:
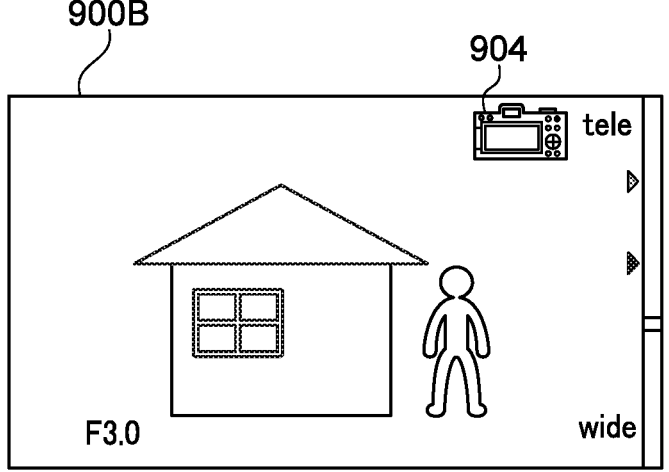

FIG. 9A and FIG. 9B are views showing examples of dedicated screens displayed on the LCD panel 113 etc. in a case where the preset zoom positions are registered to the assign buttons of the image capturing apparatus 100 as shown in FIG. 8. An exterior guide 904, a zoom meter 901, a first marker 902, and a second marker 903 of the image capturing apparatus 100 are displayed on the dedicated screen 900A in FIG. 9A.

The zoom meter 901 visually represents a zoom position (WIDE to TELE) that the image capturing apparatus 100 can take. An indicator 901A is displayed at the current zoom position. The first marker 902 is displayed to indicate the zoom position of the preset 1 with respect to the zoom meter 901 and the second marker 903 is displayed to indicate the zoom position of the preset 2 with respect to the zoom meter 901. Note that the zoom positions of the presets 1 and 2 are examples.

In the exterior guide 904 on the dedicated screen 900A, a first assign button 905 of is displayed in red and a second assign button 906 is displayed in blue. Correspondingly, the first marker 902 is displayed in red and the second marker 903 is displayed in blue. Thus, the user can easily recognize the relationships between the assign buttons and the markers.

In the dedicated screen 900A, the exterior guide 904 shall be arranged and displayed at a default setting position. The user may want to display the exterior guide 904 at a more visible position in accordance with colors of an object and background. FIG. 9B shows a dedicated screen 900B as an example after the display position of the exterior guide 904 is changed by a drag operation on the exterior guide 904. On the dedicated screen 900B, the exterior guide 904 is displayed close to the zoom meter 901 in the background so that the relationships between the assign buttons and the markers can be more easily recognized.

In the dedicated screen 900B, the exterior guide 904 is moved to a position where the OSD object is not displayed. In the meantime, if the change destination of the exterior guide 904 is an area in which "F3.0" indicating the aperture value is displayed, for example, the determination result in S410 performed later as described above becomes "Yes". As a result, the display of "F3.0" is maintained and the exterior guide 904 is not displayed.

As described above, in this embodiment, when the related functions are registered to the assign buttons mounted on the image capturing apparatus and the extension unit, the exterior guide of the surface of the image capturing apparatus on which the assign buttons are provided is displayed together with the live view image. This improves convenience when the user uses the assign buttons even during capturing an image.

Next, a second embodiment of the present invention will be described. In the second embodiment, an exterior guide of an image capturing apparatus in which a control ring, a lever, a joystick, and a dial to which related functions are registered are highlighted is displayed on a display device.

Figure 10A:
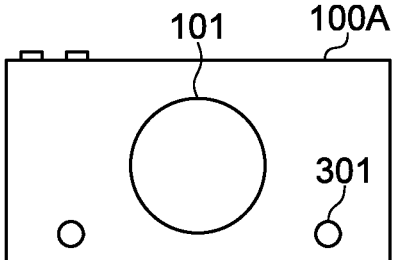
FIG. 10A, FIG. 10B, FIG. 10C, and FIG. 10D are views showing examples of arrangement positions of operation members in the image capturing apparatus according to a second embodiment.
Figure 10B:
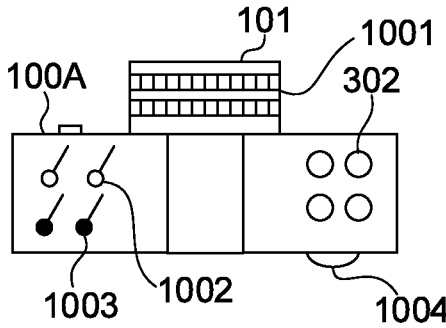
Figure 10C:
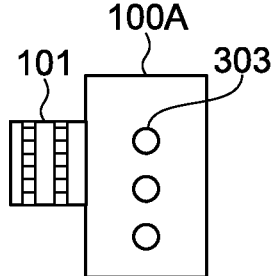
Figure 10D:
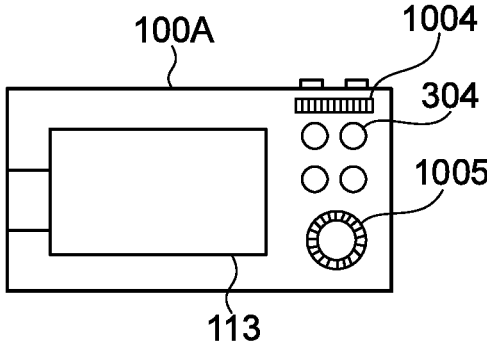

FIG. 10A is a front view of an image capturing apparatus 100A according to the second embodiment, FIG. 10B is a top view of the image capturing apparatus 100A, FIG. 10C is a side view of the image capturing apparatus 100A, and FIG. 10D is a rear view of the image capturing apparatus 100A. Among the components appeared to the exterior of the image capturing apparatus 100A, the components identical to the components appeared to the exterior of the image capturing apparatus 100 (see FIG. 3A to FIG. 3D) according to the first embodiment are denoted by the same reference numerals, and descriptions thereof will be omitted.

In the image capturing apparatus 100A, the lens 101 is provided with two control rings 1001. Two levers 1002 and two joysticks 1003 are provided on the upper surface of the housing of the image capturing apparatus 100A. Two dials 1004 and 1005 are provided on the back surface of the housing portion of the image capturing apparatus 100A. The dial 1004 is disposed so that its rotation axis (not shown) is orthogonal to an optical axis of the lens 101. The dial 1005 is disposed so that its rotation axis (not shown) is parallel to the optical axis of the lens 101.

The configuration shown in the block diagram of the image capturing apparatus 100 according to the first embodiment shown in FIG. 1 is also applied to the image capturing apparatus 100A, and the extension unit 200 described with reference to FIG. 2 in the first embodiment is attachable to and detachable from the image capturing apparatus 100A. The operation unit 204 of the extension unit 200 may include a lever, a joystick, or a dial, similarly to the image capturing apparatus 100A. Illustration and description of arrangement of assign buttons, levers, etc. in the extension unit 200 will be omitted.

A user can register desirable functions to the control rings 1001, the levers 1002, the joysticks 1003, and the dials 1004 and 1005 of the image capturing apparatus 100A. The registered functions are stored in both or either one of the ROM 109 and the RAM 110.

Figure 11:
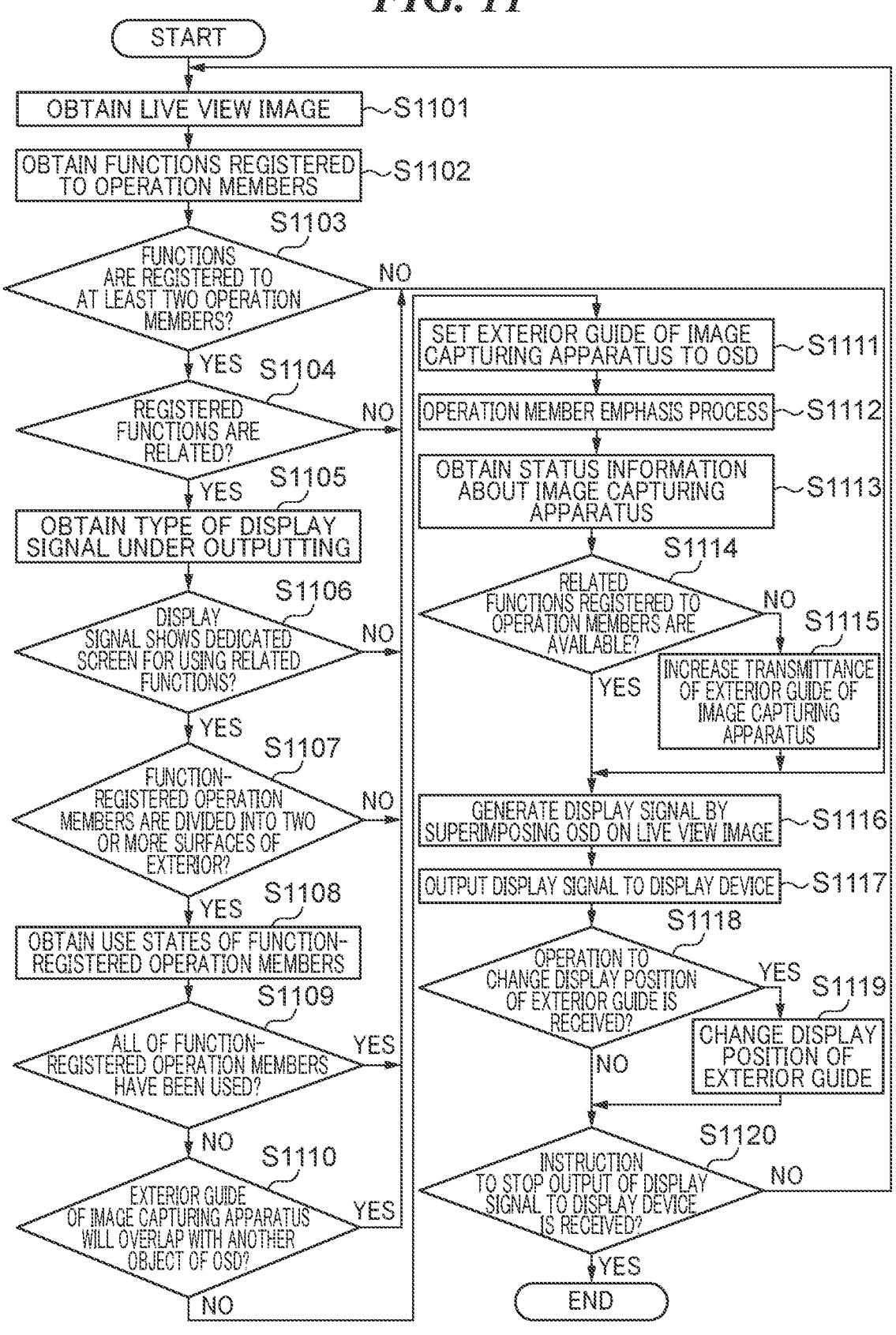
FIG. 11 is a flowchart showing an image capturing operation performed by the image capturing apparatus according to the second embodiment.

FIG. 11 is a flowchart showing an image capturing operation performed in the image capturing apparatus 100A. Each process (step) indicated by an S number in this flowchart is achieved by the CPU 118 developing a program stored in the ROM 109 onto the RAM 110 and running it to comprehensively control operations of the respective units constituting the image capturing apparatus 100A.

A process in S1101 is the same as the process in S401 in the flowchart in FIG. 4 in the first embodiment, and thus will not be described.

In S1102, the CPU 118 obtains function registration contents to operation members of the image capturing apparatus 100A. Here, the operation members refer to the assign buttons 301 to 304, the control ring 1001, the two levers 1002, the two joysticks 1003, and the dials 1004 and 1005. As described above, the function registration contents to the operation members are stored in the ROM 109 or the RAM 110. In the case where the extension unit 200 is connected to the image capturing apparatus 100A, the CPU 118 obtains the function registration contents to the operation members of the image capturing apparatus 100A and the operation members of the extension unit 200.

In S1103, the CPU 118 determines whether the functions are registered to at least two operation members of the image capturing apparatus 100A based on the function registration contents to the operation members obtained in S1102. When determining that the functions are registered to at least two operation members (Yes in S1103), the CPU 118 executes a process in S1104. When determining that there is one or less operation members to which a function is registered (No in S1103), the CPU 118 executes a process in S1116. In the case where the extension unit 200 is connected to the image capturing apparatus 100A, the CPU 118 determines whether functions are registered to at least two operation members including the operation members of the image capturing apparatus 100A and the operation members of the extension unit 200.

In S1104, the CPU 118 determines whether the functions registered to the at least two operation members are related. When determining that the functions are related (Yes in S1104), the CPU 118 executes a process in S1105. When determining that the functions are related (No in S1104), the CPU 118 executes the process in S1116.

Since the processes in S1105 and S1106 are the same as the processes in S405 and S406 in the flowchart in FIG. 4 in the first embodiment, descriptions thereof will be omitted. When determining that the screen is a dedicated screen (Yes in S1106), the CPU 118 executes a process in S1107. When determining that the screen is not a dedicated screen (No in S1106), the CPU 118 executes the process in S1116.

In S1107, the CPU 118 determines whether the operation members to which the related functions are registered are divided into two or more surfaces of the exterior of the image capturing apparatus 100A. Here, two or more surfaces of the exterior of the image capturing apparatus 100A means, for example, two or more surfaces among the four surfaces shown in FIG. 10A to FIG. 10D. In the case where the extension unit 200 is connected to the image capturing apparatus 100A, the CPU 118 determines whether each of the image capturing apparatus 100A and the extension unit 200 has operation members to which related functions are registered. Further, the CPU 118 also determines whether the operation members to which the related functions are registered are divided into two or more surfaces of the exterior of the extension unit 200. When determining that the operation members to which the related functions are registered are divided into two or more surfaces (Yes in S1107), the CPU 118 executes a process in S1108. In the meantime, when determining that the operation members to which the related functions are registered are mounted on only one surface (No in S1107), the CPU 118 executes the process in S1116. The process in S1107 can be omitted.

In S1108, the CPU 118 obtains use states of the at least two operation members to which the related functions are registered.

In S1109, the CPU 118 determines whether all of the operation members to which the related functions are registered have been used based on the use states of the operation members obtained in S1108. The determination in S1109 is performed for each exterior surface of the image capturing apparatus 100A. In the case where the extension unit 200 is connected to the image capturing apparatus 100A, the determination in S1109 is individually performed for each of the image capturing apparatus 100A and the extension unit 200. When determining that all of the operation members to which the related functions are registered have been used (Yes in S1109), the CPU 118 executes a process in S1116. The reason for this is as follows. That is, when all of the operation members to which the related functions are registered are used, it is estimated that the user knows the registration states of the related functions registered to the operation member. Therefore, it is considered that there is no need to display the exterior guide described later on the LCD panel 113 etc. In the meantime, when determining that not all of the operation members to which the related functions are registered are not used (No in S1109), the CPU 118 executes a process in S1110. The process in S1109 can be omitted.

Since the process in S1110 is the same as the process in S410 in the flowchart in FIG. 4 in the first embodiment, its description is omitted. When determining that the exterior guide will not overlap with another object (No in S1110), the CPU 118 performs a process in S1111. When determining that the exterior guide will overlap with another object (Yes in S1110), the CPU 118 performs the process in S1116. The process in S1110 can be omitted. Further, similarly to the first embodiment, it is also possible to display OSDs having different contents on the respective output destinations, such as the LCD panel 113 etc. Therefore, the determination in S1110 may be performed for each of the image capturing apparatus 100A, the external monitor, and the extension unit 200.

Since the process in S1111 is the same as the process in S411 in the flowchart in FIG. 4 in the first embodiment, its description will be omitted. In S1111, the OSD may be set by using numbers respectively registered to the operation members instead of the exterior guide of the image capturing apparatus 100A. The numbers of the operation members may be set as default values or may be set by a user operation on the menu screen.

When the operation members to which the related functions are registered include LED backlights, the CPU 118 turns on the LED backlights in S1112 (an operation member emphasis process). Accordingly, the user can easily recognize the operation members to which the related functions are registered. It should be noted that a method easy for a user to recognize the operation members to which the related functions are registered is not limited to the method of providing the LED backlights and lighting the LED backlights. The process in S1112 can be omitted.

Since a process in S1113 is similar to the process in S412 in the flowchart in FIG. 4 in the first embodiment, its description will be omitted.

In S1114, the CPU 118 determines whether the related functions registered to the operation members are available, based on the status information about the image capturing apparatus 100A obtained in S1113. When determining that the related functions are unavailable (No in S1114), the CPU 118 executes a process in S1115. When determining that the related functions are available (Yes in S1114), the CPU 118 executes the process in S1116. The process in S1114 can be omitted.

Since the process from S1115 to S1120 is the same as the process from S414 to S419 in the flowchart in FIG. 4 in the first embodiment, its description will be omitted.

Next, examples of screens displayed on the LCD panel 113 etc. will be described according to the flowchart in FIG. 11.

Figure 12A:
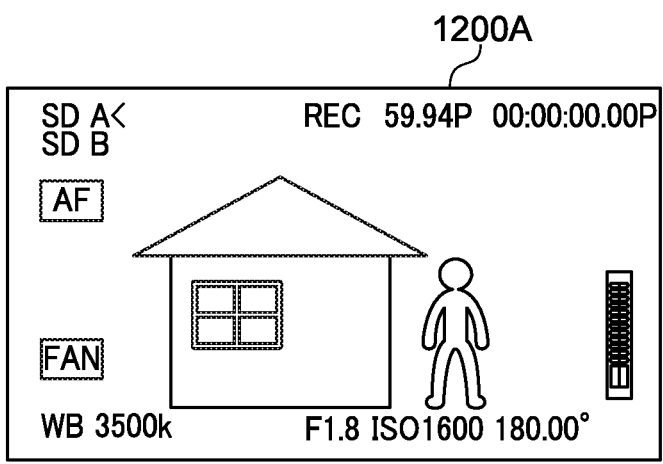
FIG. 12A and FIG. 12B are views showing examples of normal screens displayed on the display device in the second embodiment.
Figure 12B:
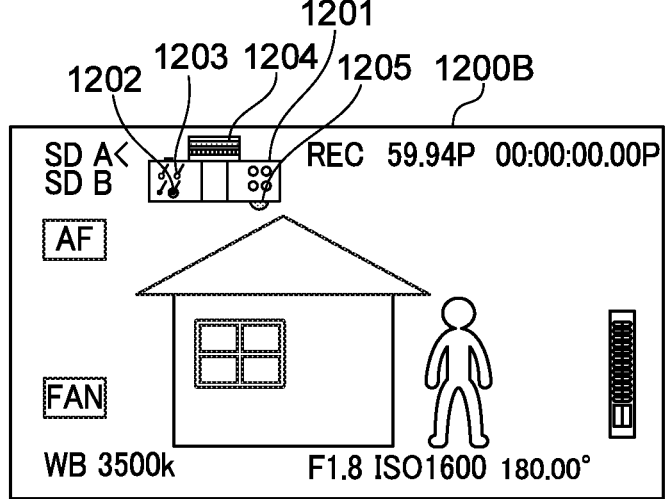

FIG. 12A and FIG. 12B are views showing examples of normal screens displayed on the LCD panel 113 etc. of the image capturing apparatus 100A. The normal screen 1200A in FIG. 12A is an example of a screen displayed when the determination result in S1106 becomes "No" and the process proceeds from S1106 to S1116. Since the process in S1111 is not executed because the process directly proceeds from S1106 to S1116, the exterior guide of the image capturing apparatus 100A is not displayed in the normal screen 1200A. The OSD in displaying the normal screen 1200A includes objects of operation information and various setting values (parameters) of the image capturing apparatus 100A, such as a recording icon (REC), an aperture value (F1.8), and an ISO sensitivity (ISO1600), as shown in FIG. 12A.

The normal screen 1200B in FIG. 12B is an example of a screen displayed when the determinations in S1106 and S1107 are omitted, and the determination result in S1109 is "No" or the determination in S1109 is omitted, the determination result in S1110 is "No", and the determination result in S1114 is "Yes". In this case, in the normal screen 1200B, an exterior guide 1201 of the image capturing apparatus 100A is displayed in a free space of the OSD in the normal screen 1200A.

In the exterior guide 1201, the operation members to which the related functions are registered are displayed in an emphasized manner. For example, the operation members are painted by different colors (for example, red, blue, green, etc.). In the exterior guide 1201, the joystick 1202, the lever 1203, the control ring 1204, and the dial 1205 are shown as the operation members to which the related functions are registered. Although not shown, an operation direction may be displayed for each of these operation members, and the display may be emphasized.

Meanwhile, when the determinations in S1106 and S1107 are omitted, the determination result in S1109 is "No", and the determination result in S1110 is "Yes", the process in S1111 is not performed, and thus the exterior guide 1201 is not displayed. As a result, in this case, the same screen as the normal screen 1200A is displayed on the LCD panel 113 etc.

Also in the second embodiment, the CPU 118 determines whether an operation for changing the display position of the exterior guide is received in S1118. When a drag operation for changing the display position of the exterior guide 1201 is performed on the normal screen 1200B and another object is arranged at the change destination of the display position in the OSD, the exterior guide is not displayed. This is because even if the process proceeds from S1118 to S1119, the process in S1111 is not performed because the determination result in S1110 becomes "Yes" after the process is subsequently returned to S1101. Instead of such a non-display process of the exterior guide 1201, a process for redisplaying the exterior guide 1201 at the original position before the drag operation may be performed.

FIG. 13A to FIG. 13D are views showing examples of functions registered to the operation members highlighted in the exterior guide 1201 in the normal screen 1200B in FIG. 12B. FIG. 13A and FIG. 13B show that the first focus position 1 is registered to the joystick 1202 of the exterior guide 1201 and the second focus position 2 is registered to the lever 1203 of the exterior guide 1201. Moreover, FIG. 13C and FIG. 13D show that a third focus position 3 is registered to the control ring 1204 of the exterior guide 1201 and a fourth focus position 4 is registered to the dial 1205 of the exterior guide 1201.

The focus position is an example of a function that can be registered to an operation member, and a function that can be registered to an operation member is not limited to the focus position. When there are a plurality of operation directions of the operation member, functions may be assigned to the respective operation directions. The operation direction refers to a direction that the operation member can recognize or a rotation direction of the operation member.

An object corresponding to a function registered to each operation member highlighted in the exterior guide 1201 is not displayed on the normal screen 1200B but is displayed on a dedicated screen as described below.

Figure 14A:
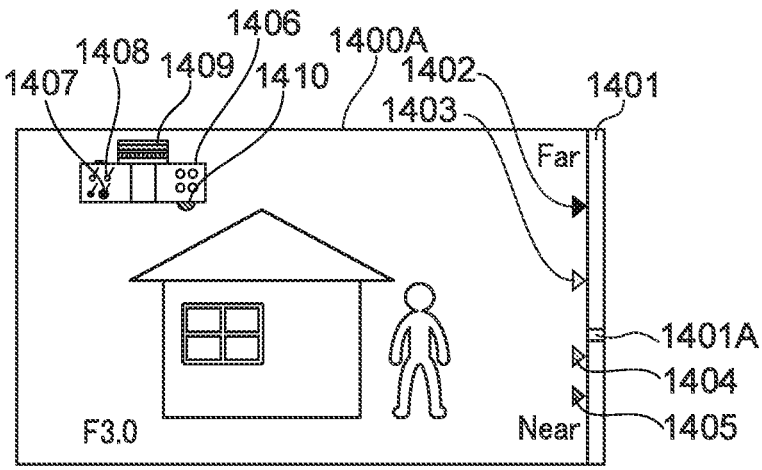
FIG. 14A, FIG. 14B, and FIG. 14C are views showing examples of dedicated screens displayed on the display device in the second embodiment.
Figure 14B:
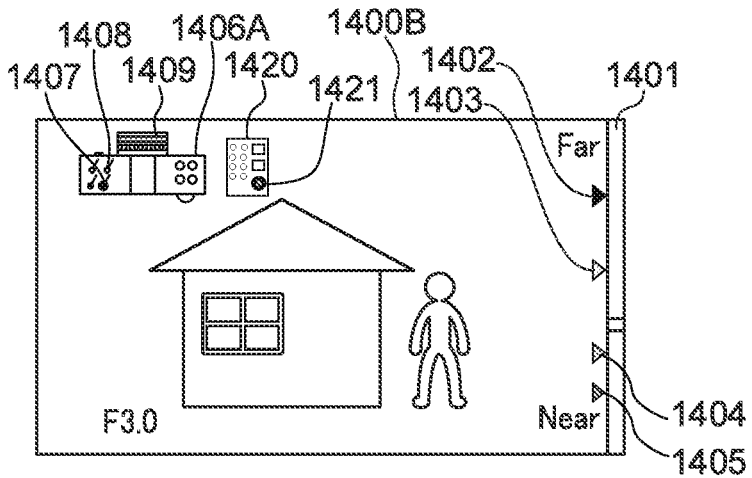
Figure 14C:
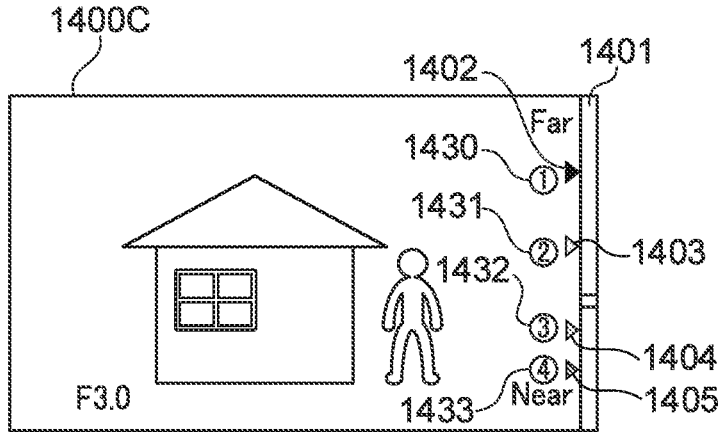

FIG. 14A to FIG. 14C are views showing examples of dedicated screens displayed on the LCD panel 113 etc. of the image capturing apparatus 100A. A dedicated screen 1400A in FIG. 14A is an example of a screen displayed when the determination result in S1106 is "Yes", the process in S1107 is omitted, the determination result in S1109 is "No" or the determination in S1109 is omitted, the determination result in S1110 is "No", and the determination result in S1114 is "Yes". On the dedicated screen 1400A, an exterior guide 1406 of the image capturing apparatus 100A is displayed. In the exterior guide 1406, a joystick 1407, a lever 1408, a control ring 1409, and a dial 1410 to which related functions are registered are displayed.

In this example, the focus positions shall be set to the joystick 1407, the lever 1408, the control ring 1409, and the dial 1410 as shown in FIG. 13. It is desirable that the joystick 1407, the lever 1408, the control ring 1409 and the dial 1410 are highlighted in the exterior guide 1406 so that the user can easily view and distinguish them. For example, the joystick 1407 is displayed in red, the lever 1408 in blue, the control ring 1409 in green, and the dial 1410 in orange.

The OSD of the dedicated screen 1400A includes objects that visually display the functions registered to the joystick 1407, the lever 1408, the control ring 1409, and the dial 1410, respectively. Specifically, a focus meter 1401 is displayed on the dedicated screen 1400A, and a first marker 1402 indicating a first focus position 1 and a second marker 1403 indicating a second focus position 2 are displayed with respect to the focus meter 1401. On the dedicated screen 1400A, a third marker 1404 indicating a third focus position 3 and a fourth marker 1405 indicating a fourth focus position 4 are displayed with respect to the focus meter 1401.

The focus meter 1401 visually represents a focus position (near to far) that can be taken by the image capturing apparatus 100A, and an indicator 1401A is displayed at the current focus position. The first marker 1402 is displayed at a position indicating the first focus position 1 with respect to the focus meter 1401, and the second marker 1403 is displayed at a position indicating the second focus position 2 with respect to the focus meter 1401. Similarly, the third marker 1404 is displayed at a position indicating the third focus position 3 with respect to the focus meter 1401, and the fourth marker 1405 is displayed at a position indicating the fourth focus position 4 with respect to the focus meter 1401.

At this time, the first marker 1402 is displayed in red corresponding to the red display of the joystick 1407, and the second marker 1403 is displayed in blue corresponding to the blue display of the lever 1408. The third marker 1404 is displayed in green corresponding to the green display of the control ring 1409, and the fourth marker 1405 is displayed in orange corresponding to the orange display of the dial 1410. Accordingly, the user can easily recognize the relationships between the operation members and the markers.

For example, when the user wants to move the focus position from the current position to the first focus position 1 displayed in red, the user can quickly determine that the user should operate the joystick 1003 corresponding to the joystick 1407 displayed in red. When the joystick 1003 corresponding to the joystick 1407 is operated, the lens 101 is driven to the first focus position 1, and the indicator 1401A moves to the position indicated by the first marker 1402 in accordance with the driving of the lens 101.

In the dedicated screen 1400A, since information related to the operation members is preferentially displayed, the objects, such as "REC" and "ISO1600" displayed on the normal screens 1200A and 1200B are not displayed.

The dedicated screen 1400B in FIG. 14B is an example of a screen displayed when the determination result in S1106 is "Yes", the determination result in S1107 is "Yes", the determination result in S1109 is "No" or the determination in S1109 is omitted, the determination result in S1110 is "No", and the determination result in S1114 is "Yes". On the dedicated screen 1400B, similarly to the dedicated screen 1400A, an exterior guide 1406A of the image capturing apparatus 100A, the focus meter 1401, and the first to fourth markers 1402 to 1405 are displayed, and in addition, an exterior guide 1420 of the extension unit 200 is displayed. The exterior guides 1406A and 1420 are generated by the OSD rendering unit 112 in S1111 and are superimposed and displayed on the live view image.

The first focus position 1 is registered to the joystick 1407 of the exterior guide 1400B of the dedicated screen 1406A, the second focus position 2 is registered to the lever 1408, and the third focus position 3 is registered to the control ring 1409. The first marker 1402 corresponds to the first focus position 1, the second marker 1403 corresponds to the second focus position 2, and the third marker 1404 corresponds to the third focus position 3. In these points, there is no difference between the dedicated screen 1400A and the dedicated screen 1400B. A dial 1421 of the exterior guide 1420 of the extension unit 200 displayed on the dedicated screen 1400B corresponds to a dial provided in the extension unit 200, and the fourth focus position 4 is registered to the dial 1421 of the exterior guide 1420. On the dedicated screen 1400B, for example, the joystick 1407 and the first marker 1402 are displayed in red, the lever 1408 and the second marker 1403 are displayed in blue, and the control ring 1409 and the third marker 1404 are displayed in green. On the dedicated screen 1400B, the dial 1421 and the fourth marker 1405 are displayed in orange, for example.

In this way, when it is determined that the operation members to which the related functions are registered are divided into the image capturing apparatus 100A and the extension unit 200 in S1107, the exterior guides are generated for the respective surfaces and are superimposed and displayed on the live view image. When the dedicated screen 1400B is displayed on the LCD panel 113 etc., the user can easily recognize the relationships between the operation members and the markers as with the case where the dedicated screen 1400A is displayed.

The dial of the extension unit 200 corresponding to the dial 1421 of the exterior guide 1420 shall be used after the dedicated screen 1400B is displayed. In this case, the exterior guide 1420 is not displayed because the determination result in S1109 becomes "Yes" after the process of the flowchart in FIG. 11 is returned to S1101. When the operation members to which the related functions are registered are divided into a plurality of surfaces of the image capturing apparatus 100A, exterior guides representing the respective surfaces are displayed (not shown). For example, when the operation members are divided into the front surface and the upper surface of the image capturing apparatus 100A, exterior guides corresponding to FIG. 10A and FIG. 10B are displayed.

In the case where the expansion unit 200 includes a display device, the display signal for the image capturing apparatus 100A and the display signal for the extension unit 200 may be generated separately in S1116. In this case, the OSD for the image capturing apparatus 100A is generated so as not to include the exterior guide 1420 of the extension unit 200 and the fourth marker 1405. In the meantime, the OSD for the extension unit 200 is generated so as not to include the exterior guide 1406A of the image capturing apparatus 100A, the first marker 1402, the second marker 1403, and the third marker 1404.

As described above, the OSD may be generated in response to a user operation on the menu screen using numbers individually registered to the operation members instead of the exterior guide of the image capturing apparatus 100A. In the dedicated screen 1400C in FIG. 14C, the numbers assigned to the respective operation members are displayed instead of the exterior guide of the image capturing apparatus 100A.

The dedicated screen 1400C is an example of a screen displayed when the determination result in S1106 is "Yes", the determination in S1107 is omitted, the determination result in S1109 is "No" or the determination in S1109 is omitted, the determination result in S1110 is "No", and the determination result in S1114 is "Yes". A number that is formed by surrounding a numeral "1" by a circle shall be given to a first joystick mounted on the image capturing apparatus 100A, and a number that is formed by surrounding a numeral "2" by a circle shall be given to a first lever. The first joystick shall be a left one of the two joysticks 1003 shown in FIG. 10B, and similarly, the first lever shall be a left one of the two levers 1002 shown in FIG. 10B. A number that is formed by surrounding a numeral "3" by a circle shall be given to a first control ring, and a number that is formed by surrounding a numeral "4" by a circle shall be given to a first dial. The first control ring shall be one at a distal end side of the lens 101 of the two control rings 1001 shown in FIG. 10B, and the first dial shall be the dial 1004. The focus positions shall be set to the first joystick, the first lever, the first control ring, and the first dial as shown in FIG. 13.

In the dedicated screen 1400C, a number 1430 that is formed by surrounding a numeral "1" by a circle is displayed adjacent to the first marker 1402, and a number 1431 that is formed by surrounding a numeral "2" by a circle is displayed adjacent to the second marker 1403. And also, a number 1432 that is formed by surrounding a numeral "3" by a circle is displayed adjacent to the third marker 1404, and a number 1433 that is formed by surrounding a numeral "4" by a circle is displayed adjacent to the fourth marker 1405. That is, in this example, the numbers 1430, 1431, 1432, and 1433 are set to the OSD instead of the exterior guide in S1111. When the dedicated screen 1400C is displayed on the LCD panel 113 etc., the user can easily recognize the relationships between the operation members and the markers as with the case where the dedicated screen 1400A is displayed. The display of the numbers of the operation members are not limited to the numbers that are formed by surrounding the numerals by the circles. The operation members may be arranged on the same surface of the image capturing apparatus 100A, may be arranged on different surfaces, or may be separately arranged on the image capturing apparatus 100A and the extension unit 200.

Figure 15:
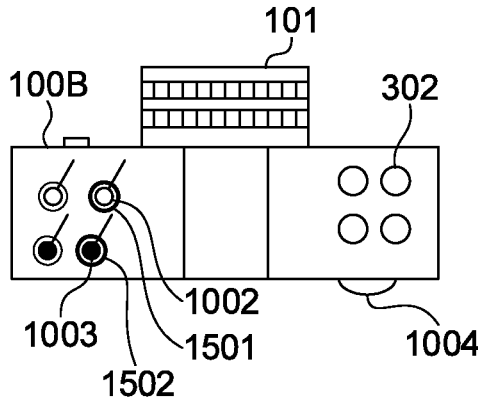
FIG. 15 is a top view of another image capturing apparatus according to the second embodiment.

FIG. 15 is an example of a top view of another image capturing apparatus 100B according to the second embodiment. The image capturing apparatus 100B is different from the image capturing apparatus 100A in that LEDs 1501 are provided in the two levers 1002 and LEDs 1502 are provided in the two joysticks 1003, but the other configurations are the same as that of the image capturing apparatus 100A.

The focus positions shall be set to the right lever of the two levers 1002 and the right joystick of the two joysticks 1003 as shown in FIG. 13. The processes in S1111 and S1112 are executed when the determination result in S1106 is "Yes", the process in S1107 is omitted, the determination result in S1109 is "Yes" or the determination in S1109 is omitted, and the determination result in S1110 is "No". When the process in S1112 is performed, the LEDs 1501 and 1502 provided on the right lever of the two levers 1002 and the right joystick of the two joysticks 1003 of the image capturing apparatus 100B turn on. This state is schematically shown in FIG. 15. This allows the user to quickly determine which operation member is to be operated when changing the focus position.

Although the present invention has been described in detail based on the preferred embodiments thereof, the present invention is not limited to these specific embodiments, and various embodiments within a scope not departing from the gist of the present invention are also included in the present invention. Further, each of the embodiments described above merely shows one embodiment of the present invention, and it is also possible to appropriately combine the embodiments.

For example, in the above-described embodiments, the focus positions and the preset zoom positions are taken as the related functions registered to the assign buttons and other operation members, but the present invention is not limited thereto, and other functions (for example, aperture values etc.) can be taken. In addition, the highlight display of the assign buttons etc. in the exterior guide is not limited to the method using predetermined colors, such as red and blue. For example, the marker and the corresponding assign button etc. may be blinked at the same timing.

In the above-described embodiments, the exterior guide or the OSD is superimposed on the live view image. However, the exterior guide or the OSD may be displayed not only on the live view image but also on a preview image, for example.

When the image capturing apparatus is set to display a normal screen, display/non-display of the exterior guide may be selected by setting from the menu screen. The image capturing apparatus according to the present invention is not limited to a digital video camera, but may be a digital still camera having a moving image capturing function. In addition, the image capturing apparatus may be an electronic device that has an image capturing function and a live view image display function, includes a plurality of operation members, and is capable of using the plurality of operation members as assign buttons during image capturing.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2022-186588, filed Nov. 22, 2022 and No. 2023-092460, filed Jun. 5, 2023, which are hereby incorporated by reference herein in their entireties.

What is claimed is:

1. An image capturing apparatus comprising:
an image capturing unit;
a display device that displays a live view image obtained by the image capturing unit;
operation members; and at least one processor or circuitry programmed to perform operations of following units;
a registration unit configured to respectively register predetermined functions to at least two operation members among the operation members; and
a control unit configured to display an exterior guide of the image capturing apparatus showing an exterior surface of the image capturing apparatus, on which the at least two operation members are arranged, together with the live view image on the display device in a case where related functions are registered to the at least two operation members,
wherein in a case where the at least two operation members are separately arranged on two or more exterior surfaces of the image capturing apparatus, the control unit displays the exterior guide for each of the two or more exterior surfaces,
wherein in a case where all of operation members to which the related functions are registered among the operation members included in the exterior guide displayed for one of the two or more exterior surfaces are used, the control unit does not display the exterior guide for the one of the two or more exterior surfaces.

2. The image capturing apparatus according to claim 1, wherein the control unit displays the exterior guide in a case where a dedicated screen for using the related functions is displayed on the display device.

3. The image capturing apparatus according to claim 1, wherein the control unit does not display the exterior guide in a case where a display position of the exterior guide will overlap with a display position of operation information or a set value of the image capturing apparatus in a normal screen on which the operation information or the set value is displayed on the display device.

4. The image capturing apparatus according to claim 3, wherein the at least one processor or circuitry is further programmed to perform operations of a selection unit configured to select display/non-display of the exterior guide on the display device in a case where the normal screen is displayed.

5. The image capturing apparatus according to claim 1, wherein the control unit does not display the exterior guide or increases transmittance of the exterior guide in a case where the functions registered to the at least two operation members are unavailable.

6. The image capturing apparatus according to claim 1, wherein the at least one processor or circuitry is further programmed to perform operations of a change unit configured to change a display position of the exterior guide in a case where the exterior guide is displayed on the display device.

7. The image capturing apparatus according to claim 6, wherein the control unit does not display the exterior guide in a case where another object is already displayed at a change destination of the display position of the exterior guide by the change unit.

8. The image capturing apparatus according to claim 1, wherein the control unit displays numbers assigned to the at least two operation members instead of the exterior guide.

9. The image capturing apparatus according to claim 1, wherein the related functions are focus positions or zoom positions.

10. A control method for an image capturing apparatus, the control method comprising:
registering predetermined functions to at least two operation members among operation members included in the image capturing apparatus;

displaying a live view image obtained by an image capturing unit on a display device; and displaying an exterior guide of the image capturing apparatus showing an exterior surface of the image capturing apparatus on which at least two operation members are arranged together with the live view image on the display device in a case where related functions are registered to the at least two operation members;

in a case where the at least two operation members are separately arranged on two or more exterior surfaces of the image capturing apparatus, displaying the exterior guide for each of the two or more exterior surfaces; and in a case where all of operation members to which the related functions are registered among the operation members included in the exterior guide displayed for one of the two or more exterior surface are used, not displaying the exterior guide for the one of the two or more exterior surface.

11. A non-transitory computer-readable storage medium storing a control program causing a computer to execute a control method for an image capturing apparatus, the control method comprising:

registering predetermined functions to at least two operation members among operation members included in the image capturing apparatus;

displaying a live view image obtained by an image capturing unit on a display device; and displaying an exterior guide of the image capturing apparatus showing an exterior surface of the image capturing apparatus on which at least two operation members are arranged together with the live view image on the display device in a case where related functions are registered to the at least two operation members;

in a case where the at least two operation members are separately arranged on two or more exterior surfaces of the image capturing apparatus, displaying the exterior guide for each of the two or more exterior surfaces; and in a case where all of operation members to which the related functions are registered among the operation members included in the exterior guide displayed for one of the two or more exterior surface are used, not displaying the exterior guide for the one of the two or more exterior surface.

12. An image capturing system comprising:
an external device comprising:
    at least one first operation member; and
    a first registration unit configured to register a predetermined function to the at least one first operation member; and
an image capturing apparatus to which the external device is communicably connected, the image capturing apparatus comprising:
    an image capturing unit;
    a display device that displays a live view image obtained by the image capturing unit;
    second operation members;
    a second registration unit configured to respectively register predetermined functions to the second operation members; and a control unit configured to display an exterior guide showing an exterior surface of the external device on which the at least one first operation member is arranged and an exterior guide showing an exterior surface of the image capturing apparatus on which at least one of the second operation members is arranged on the display device together with the live view image in a case where related functions are registered to the at least one first operation member and the at least one of the second operation members, wherein in a case where at least two of the second operation members to which the related functions are registered are separately arranged on two or more exterior surfaces of the image capturing apparatus, the control unit displays the exterior guide for each of the two or more exterior surfaces of the image capturing apparatus, wherein in a case where all of the second operation members to which the related functions are registered included in the exterior guide displayed for one of the two or more exterior surfaces of the image capturing apparatus are used, the control unit does not display the exterior guide for the one of the two or more exterior surfaces, and wherein the first registration unit, the second registration unit, and the control unit are each implemented by at least one processor or circuitry.

13. An image capturing system comprising:
an external device comprising:
    operation members; and
    a registration unit configured to register predetermined functions to the operation members; and
an image capturing apparatus to which the external device is communicably connected, the image capturing apparatus comprising:
    an image capturing unit;
    a display device that displays a live view image obtained by the image capturing unit; and
    a control unit configured to display an exterior guide showing an exterior surface of the external device on which at least two operation members among the operation members are arranged on the display device together with the live view image in a case where related functions are registered to the at least two operation members, wherein in a case where the at least two operation members are separately arranged on two or more exterior surfaces of the external device, the control unit displays the exterior guide for each of the two or more exterior surfaces of the external device, wherein in a case where all of the operation members to which the related functions are registered included in the exterior guide displayed for one of the two or more exterior surfaces of the external device are used, the control unit does not display the exterior guide for the one of the two or more exterior surfaces, and wherein the registration unit and the control unit are each implemented by at least one processor or circuitry, or a combination thereof.

* * * * *